(No Model.)
A. W. CRAM.
WATER CLOSET.
No. 605,780.  Patented June 14, 1898.
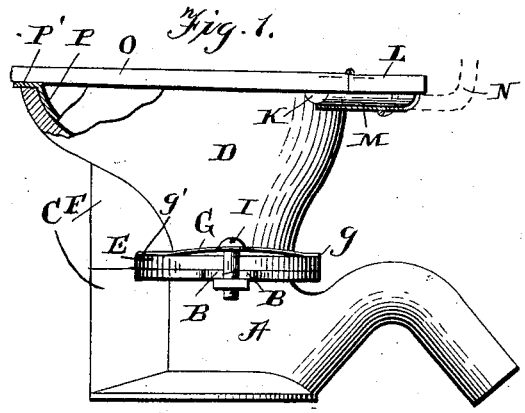
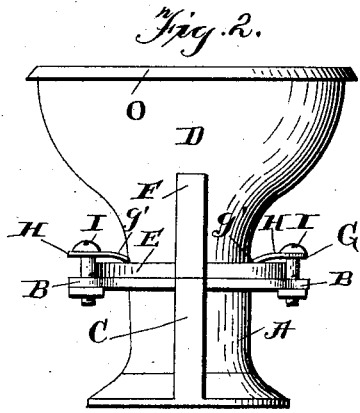
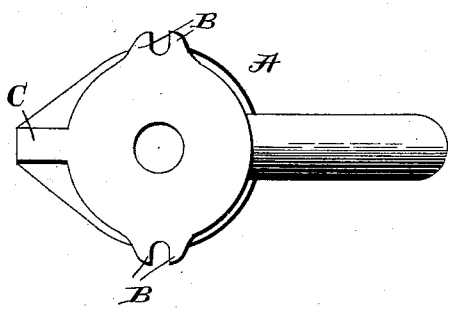
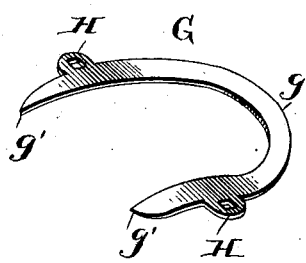
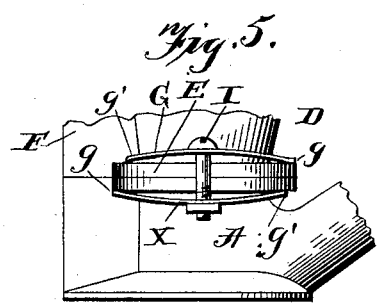
Witnesses
Geo. E. Fuch
Hubert E. Peck
Inventor
A. W. Cram
Pattison & Nesbit
Attorneys

UNITED STATES PATENT OFFICE.

ALONZO W. CRAM, OF HAVERHILL, MASSACHUSETTS.

WATER-CLOSET.

SPECIFICATION forming part of Letters Patent No. 605,780, dated June 14, 1898.

Application filed June 5, 1897. Serial No. 639,594. (No model.)

*To all whom it may concern:*

Be it known that I, ALONZO W. CRAM, of Haverhill, in the county of Essex and State of Massachusetts, have invented certain new and useful Improvements in Water-Closets; and I do hereby declare the following to be a full, clear, and exact description of the invention, such as will enable others skilled in the art to which it pertains to make and use it, reference being had to the accompanying drawings, which form part of this specification.

This invention pertains to water-closets, and has particular reference to improved means for securing the bowl to the trap and improved formation of the bowl and trap, whereby the former is materially strengthened in its upright position by the trap.

The invention consists in the novel features of construction and in the combination and arrangement of parts hereinafter fully described and claimed, and illustrated by the accompanying drawings, in which—

Figure 1 is a side elevation of the bowl and trap, shown partly in section. Fig. 2 is a front view. Fig. 3 is a plan view of the trap. Fig. 4 is a detail view of the clamp. Fig. 5 illustrates a uniting device of slightly-modified form.

The upper open end of trap A is formed with the opposite open ears B and on its front side with the outward vertical extension C at its upper end flush with the top of the trap. The base of bowl D is formed with circumferential flange E, adapted to seat flatly on the upper open end of the trap, and on its front is also formed with the vertical enlargement or offset F, which, when the bowl is in position, alines with and bears squarely on trap extension C.

Crescent-shaped clamp G embraces the bowl and rests on flange E, and on opposite sides and at points backward from the points of the crescent-shaped clamp are the overhanging perforated ears H, which aline with ears B and through which extend the securing-screws I, receiving nuts I' at their lower ends. Clamp G is sprung upwardly slightly on a line intersecting ears H, so that before the clamp is compressed by the securing-screws the back center $g$ and the points $g'$ are the only portions of the clamp contacting with flange E. As the same is compressed by the securing-screws considerable pressure is brought upon the flange at these points, and the same being on opposite sides of the securing-points the bowl is held to the trap in a most secure manner. Ears B may be omitted from the trap and the upper end of the latter formed with a flange to receive a second crescent-shaped clamp X, arranged in opposite position to clamp G, and the clamps secured as seen in Fig. 6.

In much of the plumbing now in use the bowl projects forward a considerable distance from its union with the trap, which constitutes its only support, and the bowl-neck, being somewhat slender, frequently breaks. To obviate this difficulty, I provide the forward vertical extensions C and F, before described, which constitute a substantially vertical support for the front of the bowl, and thus relieve the bowl-neck of the strain referred to. The bowl and trap are here shown as each provided with an extension; but I do not desire to limit myself to such arrangement, as the extension of the trap may be of sufficient length to reach to the front side of the bowl, thus omitting entirely the bowl extension, or the bowl extension may be of sufficient length to reach an extension of the trap or the floor. With either of these constructions the bowl will be effectually braced, though I prefer the arrangement illustrated and first described.

The top edge of the bowl is notched on its rear side at K, and in close proximity thereto on the under side of seat-back piece L is coupling M, to which ventilator-pipe N is joined. A simple and effective arrangement is thus provided for carrying off the closet-odors without in any way interfering with or changing the usual construction of the hinged seat O; nor is the bowl weakened in the least by such arrangement.

On the under side of the seat, at its front, is the semicircular guard P, formed of yielding material, preferably rubber, which depends slightly into the bowl, the securing edge P' of the guard forming a cushion between the hinged seat and the top edge of the bowl and reducing the liability of breakage of the bowl by the seat when accidentally dropped from raised position. With my improved guard in position the closet may be used by both sexes without danger of splashing between the seat and bowl.

Having thus fully described my invention, what I claim as new, and desire to secure by Letters Patent, is—

1. An improved partially-curved clamping device for the purpose described, consisting of the crescent-shaped plate formed with perforations at points backward from its ends, the plate being sprung upward slightly on a line intersecting the perforations, the back center of the plate and also its points thus depending in the manner and for the purpose herein shown and described.

2. The combination of a trap formed with projected ears, a bowl formed with a base peripheral flange, and a crescent-shaped clamping-plate adapted to embrace the bowl and rest on the flange, the plate being formed with perforated laterally-projecting ears at points backward from the ends of the clamping-plate, said ears alining with the trap-ears, the plate being sprung upward in the manner and for the purpose described, and the securing-screws, substantially as set forth.

3. An improved coupling for uniting flanged closet bowls and traps, including a yoke adapted to embrace one of said parts and rest on the flange thereof, said yoke being sprung between its ends so as to stand away from the flange, and securing means uniting with the spring portion of the yoke and adapted to compress the same toward the flange, substantially as shown and described.

In testimony whereof I affix my signature in presence of two witnesses.

ALONZO W. CRAM.

Witnesses:
JOSEPH E. ROBINSON,
KINGFORD J. MURRAY.